United States Patent
Chen et al.

(10) Patent No.: US 11,105,963 B1
(45) Date of Patent: Aug. 31, 2021

(54) OPTICAL SYSTEMS WITH ADJUSTABLE LENSES

(71) Applicant: Apple Inc., Cupertino, CA (US)

(72) Inventors: Yuan Chen, Santa Clara, CA (US); Bennett S. Wilburn, San Jose, CA (US); Cheng Chen, San Jose, CA (US); Michael Slootsky, Santa Clara, CA (US); Shuang Wang, Sunnyvale, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 583 days.

(21) Appl. No.: 15/454,195

(22) Filed: Mar. 9, 2017

Related U.S. Application Data

(63) Continuation of application No. 15/381,882, filed on Dec. 16, 2016, now abandoned.

(Continued)

(51) Int. Cl.
  *G02F 1/29* (2006.01)
  *G02B 3/14* (2006.01)
  (Continued)

(52) U.S. Cl.
  CPC .............. *G02B 3/14* (2013.01); *G02B 5/20* (2013.01); *G02B 15/14* (2013.01); *G02B 27/288* (2013.01); *G02B 30/25* (2020.01); *G02F 1/294* (2021.01)

(58) Field of Classification Search
  CPC .... G02B 27/26; G02B 2001/294; G02B 3/14; G02B 27/288; G02B 15/14; G02B 5/20; G02F 2001/294
  See application file for complete search history.

(56) References Cited

U.S. PATENT DOCUMENTS

| | | | |
|---|---|---|---|
| 8,028,473 B2 | 10/2011 | Galstain et al. | |
| 2004/0240777 A1* | 12/2004 | Woodgate | G02B 30/25 |
| | | | 385/16 |

(Continued)

FOREIGN PATENT DOCUMENTS

| | | |
|---|---|---|
| WO | 2003032066 | 4/2003 |
| WO | 2014176695 | 11/2014 |

OTHER PUBLICATIONS

Kirby et al., "Adaptive lenses based on polarization modulation", Proc. SPIE 6018, 5th International Workshop on Adaptive Optics for Industry and Medicine, 601814 (Jun. 8, 2006); doi:10.1117/12.669373; http://dx.doi.org/10.1117/12.669373.

*Primary Examiner* — Thanh Nhan P Nguyen
(74) *Attorney, Agent, or Firm* — Treyz Law Group, P.C.; G. Victor Treyz; Joseph F. Guihan

(57) ABSTRACT

Optical systems may have tunable lenses with focal lengths that are adjusted by control circuitry. A display may produce image light that is received by a tunable lens. The display may be transparent so that light from objects can pass through the display and be received by the tunable lens. The tunable lens may include a birefringent lens element and a polarization rotator and may receive light that has been linearly polarized by passing through a linear polarizer. The polarization rotator may be operable in a first state in which the polarization of light passing through the polarization rotator is not rotated and a second state in which the polarization of light passing through the polarization rotator is rotated by 90°. The birefringent lens element may be formed from a cured liquid crystal polymer or other polymer and may have a liquid crystal additive to enhance birefringence.

13 Claims, 7 Drawing Sheets

Related U.S. Application Data

(60) Provisional application No. 62/305,811, filed on Mar. 9, 2016.

(51) Int. Cl.
    *G02B 5/20*      (2006.01)
    *G02B 15/14*    (2006.01)
    *G02B 27/28*    (2006.01)
    *G02B 30/25*    (2020.01)

(56) References Cited

U.S. PATENT DOCUMENTS

| | | | |
|---|---|---|---|
| 2007/0159701 A1* | 7/2007 | Campbell | G02B 5/3083 359/676 |
| 2008/0088756 A1 | 4/2008 | Tseng et al. | |
| 2010/0286334 A1* | 11/2010 | Ando | C08L 75/04 524/750 |
| 2011/0181706 A1* | 7/2011 | Harrold | G02B 30/26 348/51 |
| 2012/0092586 A1* | 4/2012 | He | G02F 1/29 349/61 |
| 2012/0212696 A1* | 8/2012 | Trajkovska | G02F 1/133753 349/123 |
| 2012/0262663 A1 | 10/2012 | Chin et al. | |
| 2015/0124185 A1* | 5/2015 | Lin | G02B 27/2214 349/15 |
| 2015/0185487 A1* | 7/2015 | Lee | G02B 3/14 349/15 |

* cited by examiner

OPTICAL SYSTEMS WITH ADJUSTABLE LENSES

This application is a continuation of U.S. patent application Ser. No. 15/381,882, filed Dec. 16, 2016, and U.S. provisional patent application No. 62/305,811, filed Mar. 9, 2016, which are hereby incorporated by reference herein in their entireties.

BACKGROUND

This relates generally to optical systems and, more particularly, to optical systems with adjustable lenses.

Cameras, display projectors, and other optical systems have lenses. It may sometimes be desirable to adjust a lens. For example, it may be desirable to adjust the focal length of a zoom lens or it may be desirable to focus a lens. Many optical systems are provided with manually adjustable lens mounts that allow lens adjustments such as focal length adjustments to be made. Motors and other electrically controllable elements may also be used in making lens adjustments.

Optical systems with adjustable lenses such as these may be bulky and may respond more slowly than desired to control commands. It would therefore be desirable to be able to provide improved optical systems with adjustable lenses such as compact electrically adjustable lenses.

SUMMARY

Optical systems may have adjustable lenses. The adjustable lenses may have focal lengths that are adjusted by control circuitry. Adjustable lenses may be used in adjusting magnification and focus in optical systems, may be used in optical systems with displays, and may be used in other optical systems.

A display in an optical system may produce images. The display may be transparent so that light from external objects can pass through the display. Light from images on the display and external objects can pass through an adjustable lens before reaching a viewer. The adjustable lens may be configured to exhibit different focal lengths.

The adjustable lens may include a birefringent lens element and a polarization rotator. Light received by the polarization rotator may be passed through a linear polarizer before being received by the polarization rotator. The polarization rotator may be operable in a first state in which the polarization of light passing through the polarization rotator is not rotated by the polarization rotator and a second state in which the polarization of light passing through the polarization rotator is rotated by 90° before reaching the birefringent lens element. The birefringent lens element may be formed from a liquid crystal polymer or other polymer having a liquid crystal additive to enhance birefringence or may be formed from a polished birefringent crystal.

Tunable lenses may be formed from a stack of multiple tunable focal length lenses. Polymer layers may be formed over lenses and may have indices of refraction that are selected to adjust the optical properties of the lenses. In polymer liquid crystal lenses, alignment layers or electrodes may be used to align liquid crystal material in desired orientations during polymer curing.

The polarization rotator may be a liquid crystal polarization rotator such as a twisted nematic (TN) liquid crystal polarization rotator. Control circuitry in the optical system can adjust polarization rotators and therefore lens focal length using control signals while creating synchronized images on a display.

DETAILED DESCRIPTION

Figure 1:
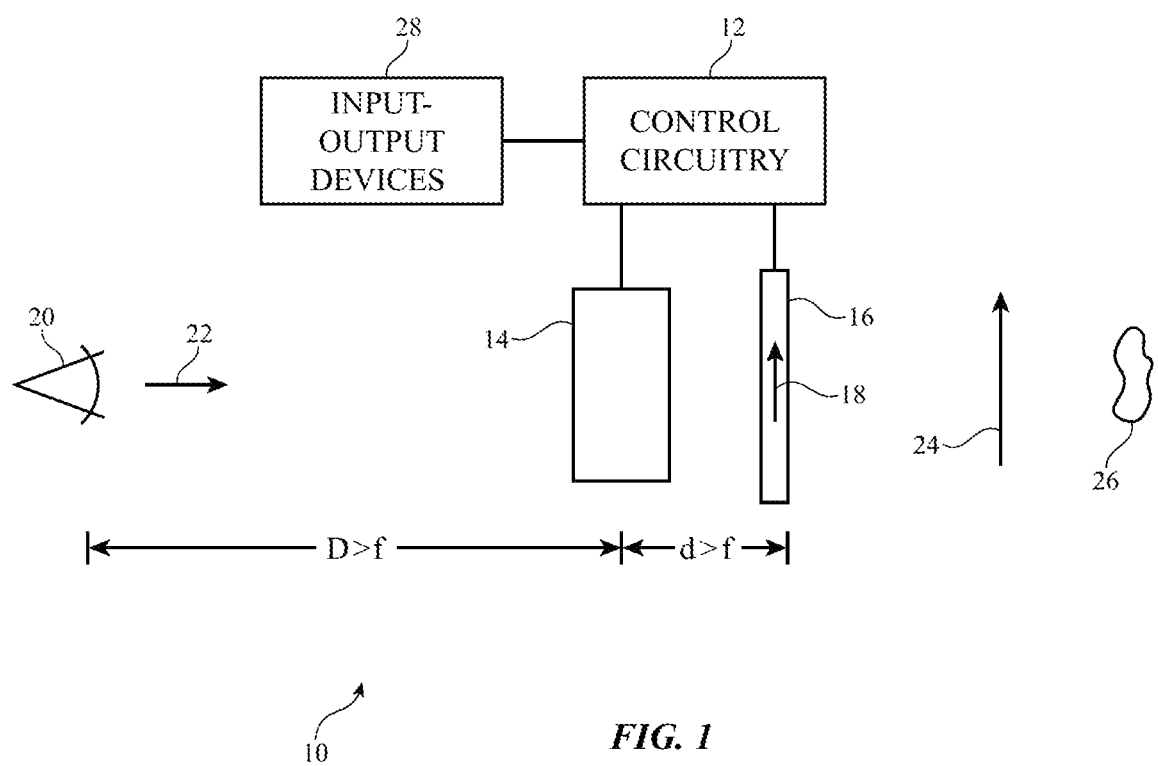
FIG. 1 is a diagram of an illustrative optical system having a tunable lens in accordance with an embodiment.

An illustrative optical system of the type that may be provided with tunable optical structures is shown in FIG. 1. As shown in FIG. 1, optical system 10 may include a tunable lens such as adjustable lens 14. Lens 14 may include one or more lens elements (lenses) and may be adjusted electrically based on control signals received from control circuitry 12. Control circuitry 12 may include storage and processing circuitry for supporting the operation of system 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of system 10. The processing circuitry may be based on one or more microprocessors, microcontrollers, digital signal processors, baseband processors, power management units, audio chips, application specific integrated circuits, etc. System 10 may form all or part of an electronic device such as a camera, a projector, a display (e.g., a head mounted display), an embedded system such as a system in an automobile, airplane, or other vehicle, a cellular telephone, a computer, or other electronic equipment. For example, system 10 may be a system that displays images to a user such as user 20.

To control the operation of system 10, system 10 may be provided with input-output devices 28. Input-output devices 28 be used to allow data to be supplied to system 10 and to allow data to be provided from system 10 to external devices. Input-output devices 28 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of system 10 by supplying commands through input-output devices 28 and may receive status information and other output from system 10 using the output resources of input-output devices 28.

System 10 may include one or more displays such as display 16. Display 16 may be a liquid crystal display, an organic light-emitting diode display, a display formed from discrete light-emitting diode dies, or a display formed using other types of display technology. Display 16 may include an array of pixels for displaying images for user 20 such as image 18. User 22 may view image 18 in direction 22 through lens 14. Due to the presence of lens 14, a virtual image such as virtual image 24 that corresponds to image 18 on display 16 may be viewed by user 22. In the illustrative arrangement of FIG. 1, lens 14 is located at a distance D from user 20 that is larger than focal length f of lens 14 and is located at a distance d from display 16 that is less than focal length f, so virtual image 24 is magnified, but other configurations may be used, if desired. Display 16 may be opaque or may be transparent (e.g., display pixels may be formed on transparent substrates) so that real-life objects such as illustrative object 26 (e.g., a building, road, household object, or other object) may be viewed by user 20 through display 16 in addition to the images produced by display 16.

The properties of lens 14 may be adjusted to adjust the appearance of virtual image 24. For example, the focal length of lens 14 may be adjusted. In systems such as head-up displays (e.g., augmented reality or virtual reality displays), the focal length of lens 14 may be adjusted to reduce or eliminate vergence-accommodation mismatch. Other types of systems may also use lens focal length adjustments. In general, an adjustable-focal-length lens such as lens 14 of FIG. 1 may be used in any suitable optical system in which it is desired to change the focal length properties of a lens. The use of lens 14 in a system of the type shown in FIG. 1 in which lens 14 is interposed between a display such as illustrative transparent display 16 and user 20 is merely illustrative.

Figure 2:
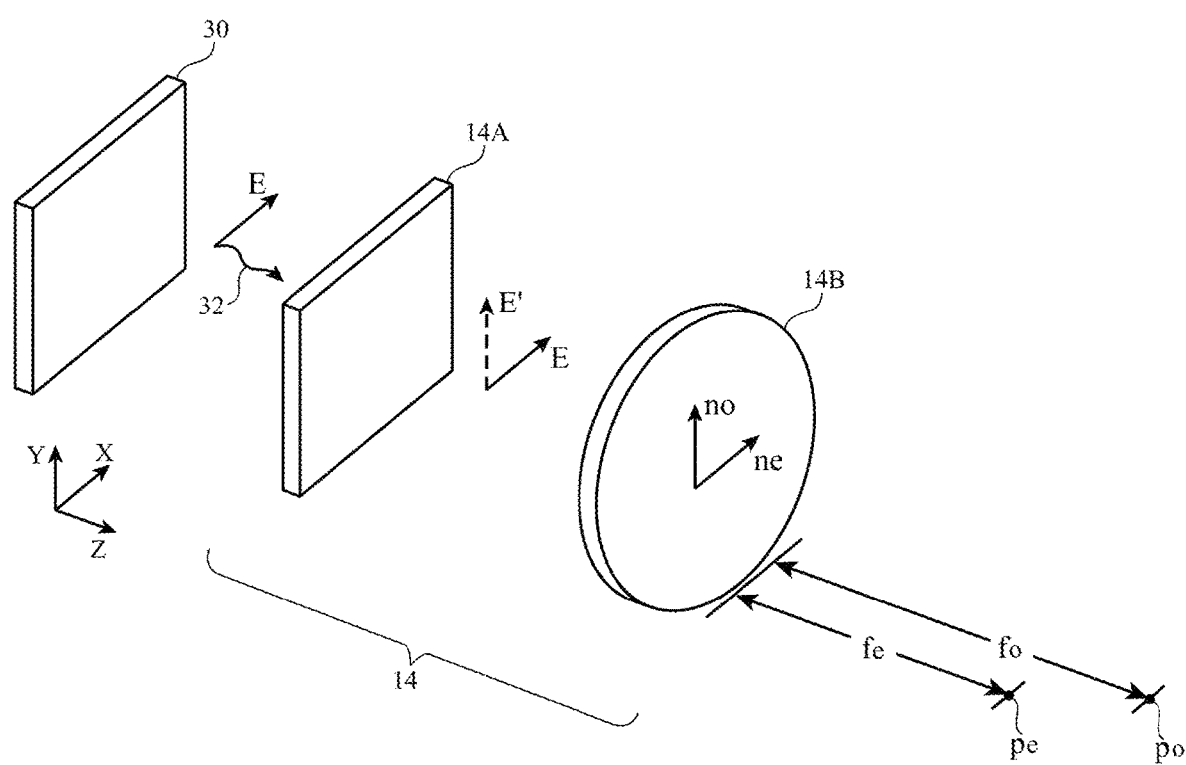
FIG. 2 is perspective view of an illustrative tunable lens having a polarization rotator and a birefringent lens in accordance with an embodiment.

Lens 14 may have optical components of the type shown in FIG. 2. In particular, lens 14 may have a polarization rotator such as polarization rotator 14A and a birefringent lens element such as birefringent lens 14B. Optical system 10 may have a linear polarizer such as polarizer 30. Polarizer 30 may polarize light from display 16 and/or light from objects in the user's environment such as object 26. With one illustrative configuration, linear polarizer 30 is formed as the uppermost layer in display 16. In general, linear polarizer 30 may be associated with any suitable structure in optical system 10 and need not be incorporated into a display.

Control circuitry 12 may adjust the polarization rotation properties of polarization rotator 14A so that lens 14 exhibits either a first focal length fo or a second focal length fe<fo. This adjusts the position at which light 32 is focused in the example of FIG. 2. In the FIG. 2 example, birefringent lens 14B has an ordinary index of refraction no that is aligned with dimension Y and an extraordinary index of refraction ne that is aligned with dimension X. Linearly polarized light 32 that is being received by rotator 14A has an electric field that is aligned with dimension X. After passing through rotator 14A, light 32 passes through adjustable lens 14 and is focused at point Pe or Po.

Polarization rotator 14A has two different states. When control circuitry 12 places polarization rotator 14A in its first state, polarization rotator 14A will not rotate the polarization of light 32 (i.e., electric field E of light 32 will remain aligned with dimension X). In this situation, light 32 will experience an index of refraction of ne when passing through lens 14B and the focal length of lens 14B will be fe. Light 32 will therefore focus at point Pe. When control circuitry 12 places polarization rotator 14A in its second state, polarization rotator 14A will rotate the polarization of light 32 by 90° about axis Z (i.e., electric field E of light 32 will rotate out of alignment with dimension X and into alignment with dimension Y). In this situation, light 32 will experience an index of refraction of no when passing through lens 14B and the focal length of lens 14B will be fo. Light 32 will therefore focus at point Po.

Lens structures such as polarization rotator 14A and birefringent lens element 14B may be stacked on top of each other and may, if desired, be stacked in groups (i.e., lens 14 may be formed from multiple pairs of polarization rotators and birefringent lenses). In this way, the overall properties of lens 14 may be altered for different applications (e.g., the focal length of lens 14 may be shortened by stacking additional lenses). Stacked lens systems may also exhibit additional tuning states. For example, in a stacked lens system having a first tunable lens with two focal lengths and a second tunable lens with two focal lengths, the stacked lens system may exhibit four selectable focal lengths.

Polarization rotator 14A may be formed from a liquid crystal polarization rotator structure or other suitable polarization rotator device. Birefringent lens 14B may be formed from a birefringent crystal (e.g., calcite), may be formed from a birefringent liquid crystal lens, or may be formed from any other suitable birefringent lens structure.

Figure 3:
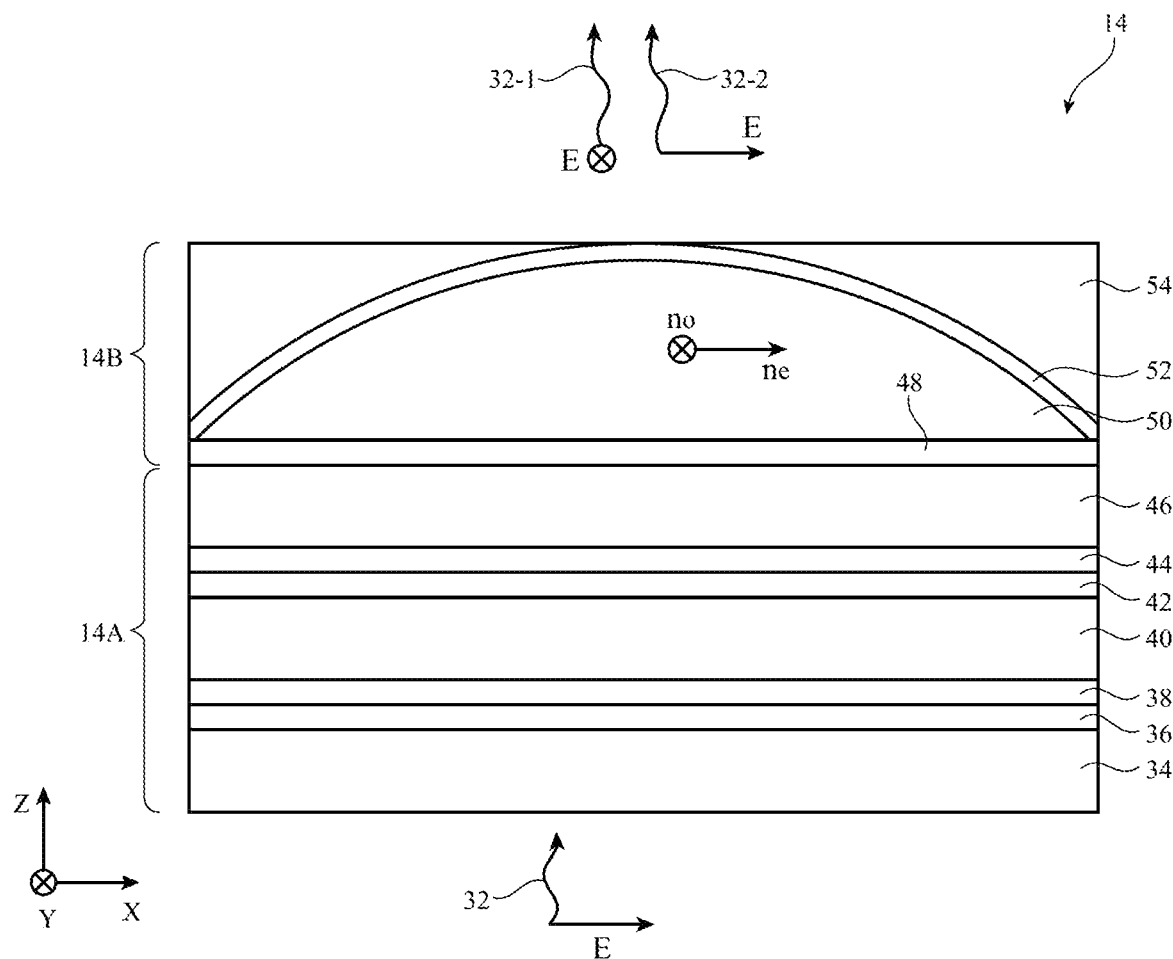
FIG. 3 is a cross-sectional side view of an illustrative tunable liquid crystal lens in accordance with an embodiment.

As shown in the illustrative configuration of FIG. 3, polarization rotator 14A may be formed from a liquid crystal polarization rotator such as a twisted nematic liquid crystal polarization rotator and birefringent lens 14B may be formed from a liquid crystal lens structure.

In the example of FIG. 3, lens 14 has clear substrates such as substrates 34 and 46. Substrates 34 and 36 may be formed from transparent materials such as clear glass or plastic. Transparent electrodes such as electrodes 36 and 44 may be formed from a transparent conductive material such as indium tin oxide and may receive electrical signals from control circuitry 12 to control the electric field across liquid crystal layer 40. Electrode 36 may be formed on the surface of substrate 34 that faces liquid crystal layer 40. Electrode 44 may be formed on the surface of substrate 46 that faces liquid crystal layer 40. Liquid crystal alignment layers such as layers 38 and 42 may be formed on electrodes 36 and 44. Layer 38 may be interposed between electrode 36 and layer 40. Layer 42 may be interposed between electrode 44 and layer 40.

Alignment layers 38 and 42 may be formed from polyimide or other suitable material that has been processed to form surfaces that help align the liquid crystals of layer 40 in a desired direction. With one suitable arrangement, layers 38 and 42 may be formed from photosensitive polymer (e.g., polyimide) that is exposed to linearly polarized ultraviolet light during curing. Other processes may be used for forming liquid crystal alignment layers for polarization rotator 14A, if desired.

When liquid crystal layer 40 is placed between alignment layers 38 and 42, the liquid crystals of layer 40 will be aligned in an orientation determined by the properties of alignment layers 38 and 42. In the absence of an applied electric field across electrodes 36 and 44, the liquid crystals of layer 40 will not be rotated away from their default alignment and light 32 that passes through polarization rotator 14A will be emitted as light 32-2 having a polarization direction (electric field orientation) aligned with axis X (as an example). Light 32-2 will experience index of refraction ne when passing through birefringent lens 14B. When an electric field is applied across electrodes 36 and 44 by control circuitry 12, polarization rotator 14A will rotate the polarization of light 32. In particular, the liquid crystals of layer 40 will be rotated in response to the electric field so that layer 40 will, in turn, rotate the polarization of light 32 by 90° into alignment with axis Y (i.e., light 32 will be emitted as light 32-1 having a polarization aligned with axis Y). Light 32-1 will experience index of refraction no when passing through birefringent lens 14B. Accordingly, lens 14B and therefore lens 14 will exhibit different focal lengths depending on the setting of polarization rotator 14B.

Lens 14B of FIG. 3 may be formed from a birefringent material such as an ultraviolet-light-curable liquid crystal polymer with an optional liquid crystal additive to enhance birefringence. The liquid crystal polymer may initially be dispensed in an uncured liquid monomer state and may fill a lens-shaped cavity between layer 54 and substrate layer 48. Layers 48 and 54 may be clear layers formed from glass, polymer, or other clear material. For example, layer 54 may be formed from polymer. Alignment layers may be formed on the inner surfaces of the lens cavity. For example, alignment layer 52 may be formed on the lower surface of layer 54 and alignment layer 48 may be formed on the upper layer of substrate 46. Alignment layers 52 may be formed by exposing photosensitive polymer such as a photosensitive polyimide to linearly polarized ultraviolet light during curing of the polyimide from a liquid polymer precursor or may be formed using other suitable alignment layer formation techniques. The presence of alignment layers 52 and 48 aligns the liquid crystal material of lens layer 50 in a desired direction and thereby gives rise to a desired birefringence (differing indices no and ne) in layer 50. Ultraviolet light may be applied to layer 50 to cure and thereby solidify layer 50 (i.e., to convert layer 50 from its liquid monomer form into a solid polymer birefringent material).

The index of layer 54 and the birefringent properties of layer 50 may be selected to provide lens 14B with desired optical characteristics. With one suitable arrangement, layer 50 may be formed from an ultraviolet-light-cured polymer such as RM257 (e.g., a liquid crystal polymer) and layer 54 may be formed from a polymer (e.g., an ultraviolet-light-cured polymer) such as polymethylmethacrylate (PMMA). In a configuration in which the index of refraction of layer 54 is equal to ordinary index no of layer 50, lens 14B will exhibit a focal length of infinity (when the polarization of light 32 is aligned with axis Y) and a finite focal length when the polarization of light 32 is aligned with axis X). If the index of refraction of layer 54 is greater than ordinary index no of layer 50, lens 14 will, depending on the polarization of light exiting rotator 14A, have a first focal length that is negative (lens 14B will act as a concave lens) or will have a second focal length that is either positive or negative. If the index of refraction of layer 54 is less than no, lens 14B will act as a convex lens with two focal lengths (depending on the polarization of light from rotator 14A).

In the example of FIG. 3, substrate 46 serves both as a substrate for alignment layer 44 (and electrode 44) and as a substrate for alignment layer 48. If desired, multiple substrate layers may be used to form layer 46 (e.g., multiple layers of glass and/or plastic).

The thickness of liquid crystal layer 40 in polarization rotator 14A may be 1-10 microns, less than 50 microns, less than 20 microns, less than 5 microns, more than 1 micron, or other suitable thickness. When the thickness of liquid crystal layer is sufficiently thin, the tuning speed of rotator 14B may be high (e.g., 5 ms, less than 10 ms, more than 1 ms, or other suitable amount).

Figure 4:
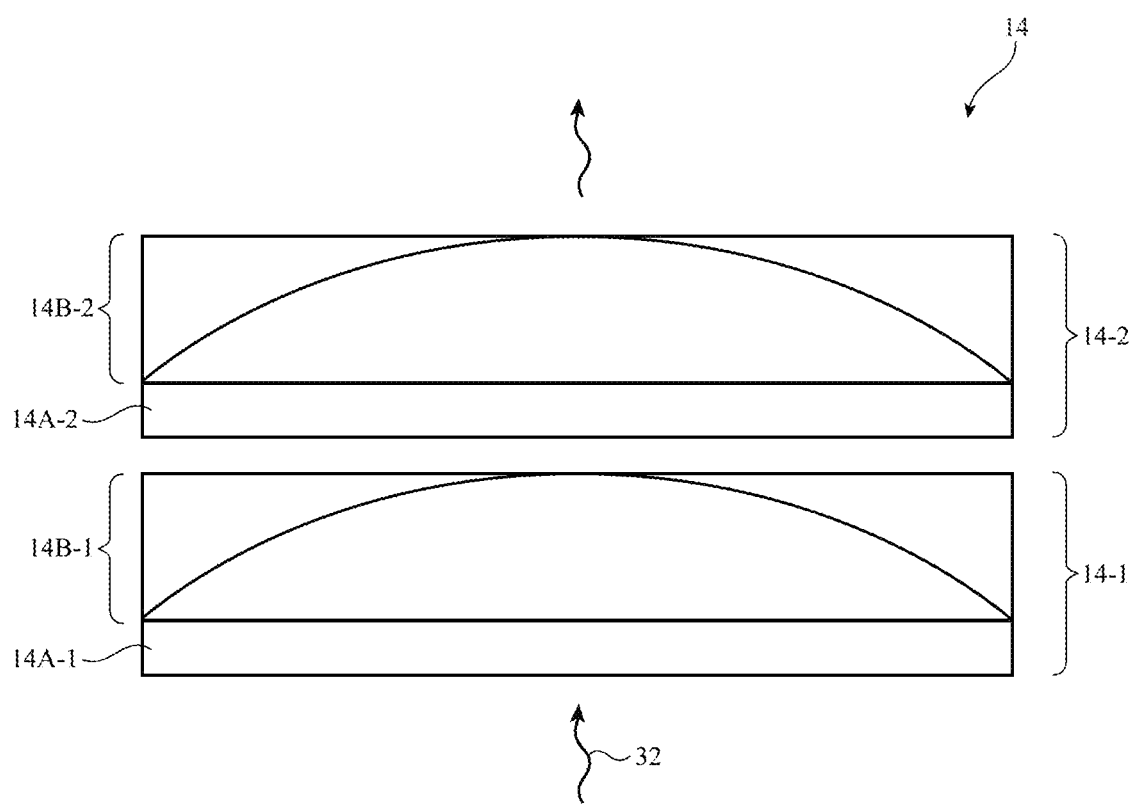
FIG. 4 is a cross-sectional side view of an illustrative lens having a stack of two tunable lenses in accordance with an embodiment.

As shown in FIG. 4, lens 14 may include multiple stacked tunable lenses. In the FIG. 4 example, lens 14 includes first tunable lens 14-1 with polarization rotator 14A-1 and birefringent lens 14B-1 and second tunable lens 14-2 with polarization rotator 14A-2 and birefringent lens 14B-2. In general, adjustable focal length lens 14 may include any suitable number of stacked adjustable lenses (one or more, two or more, three or more, etc.). In configurations with more stacked lenses, lens 14 can be adjusted to produce correspondingly larger numbers of focal lengths. For example in a two-lens stacked lens arrangement of the type shown in FIG. 4, lens 14-1 may be adjusted to produce focal length fa or focal length fb and lens 14-2 may be adjusted to produce focal length fc or fd. By cycling through different combinations of focal length (e.g., fa/fc, fa/fd, fb/fc, and fb/fd), lens 14 may exhibit four different focal lengths.

The ability to switch the polarization rotators of lens 14 at relatively high speeds (e.g., on the order of kHz) may allow lenses such as stacked lens 14 of FIG. 4 to exhibit each of its different focal lengths in rapid succession. The images produced by display 16 (e.g., image frames) may be synchronized with these focal length changes, so that different images may be rendered by system 10 at different apparent distances from user 20 while minimizing or eliminating vergence accommodation mismatch.

Figure 5:
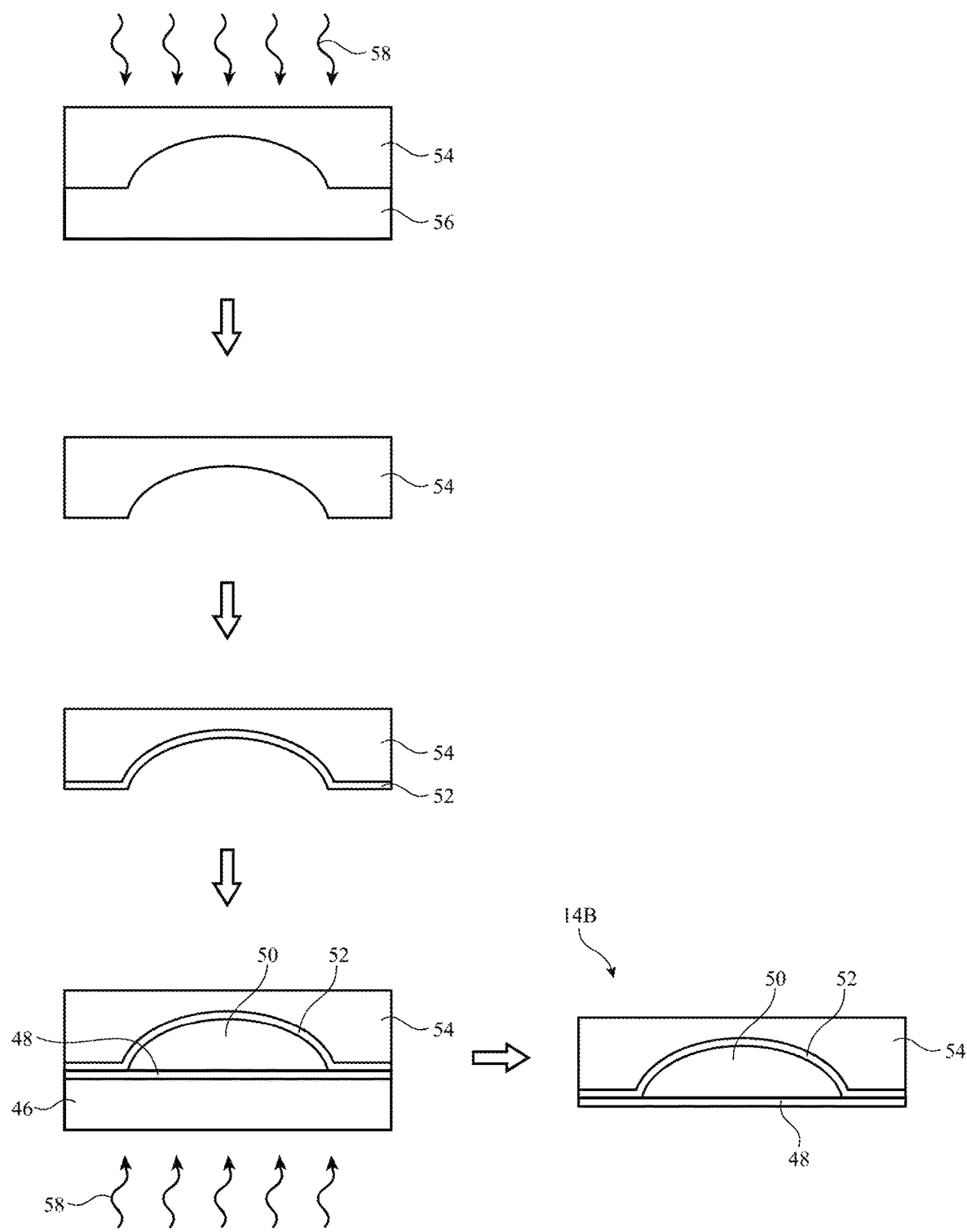
FIG. 5 is a diagram showing operations and structures associated with forming a liquid crystal lens in accordance with an embodiment.

Illustrative operations associated with forming birefringent liquid crystal lenses are shown in FIG. 5. Initially, a liquid ultraviolet-light-curable polymer for forming layer 54 may be deposited over mold 56. Mold 56 may have lens-shaped protrusions. The liquid polymer of layer 54 may be cured by application of ultraviolet light 58 or may be cured using other curing techniques (catalyst, elevated temperature, room temperature curing, etc.).

After curing the polymer of layer 54 to solidify layer 54, layer 54 may be removed from mold 56.

Layer 54 and associated substrate layer 46 may then be coated with alignment layers 52 and 48, respectively and may be sandwiched together to form a lens cavity that receives layer 50 (e.g., an ultraviolet-light-curable liquid polymer such as a liquid crystal polymer with an optional liquid crystal additive for enhancing birefringence). While the liquid crystals of layer 50 are being aligned by alignment layers 48 and 52, the polymer material of layer 50 may be cured. For example, ultraviolet light 58 may be applied to layer 50 to cure layer 50 and thereby lock the birefringence of layer 50 in place. Lens 14B may then be peeled away from substrate 46 (or may be left in place on substrate 46) and may be assembled with rotator 14A to form a tunable lens.

Figure 6:
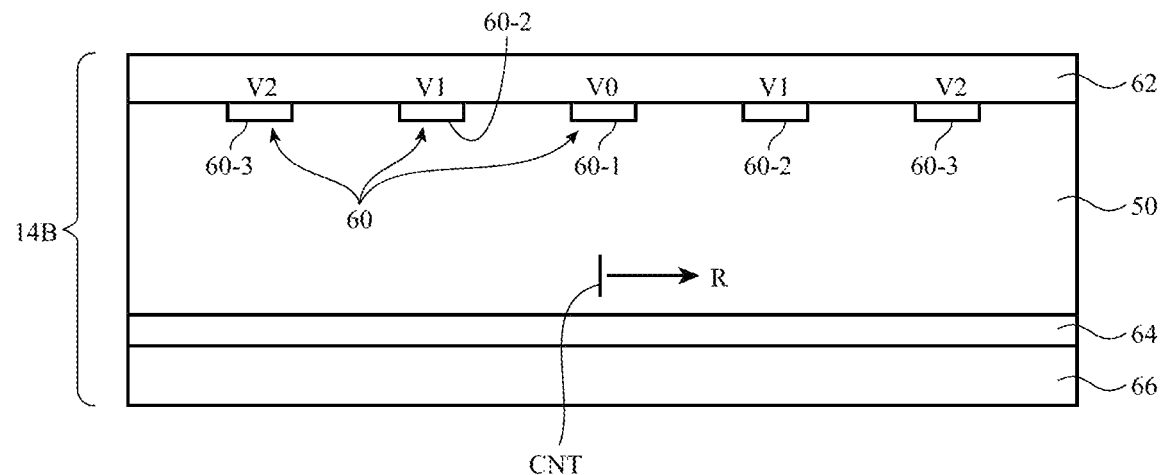
FIG. 6 is a cross-sectional side view of an illustrative liquid crystal lens with ring-shaped concentric electrodes for applying electric fields to liquid crystal material in the lens in accordance with an embodiment.
Figure 7:
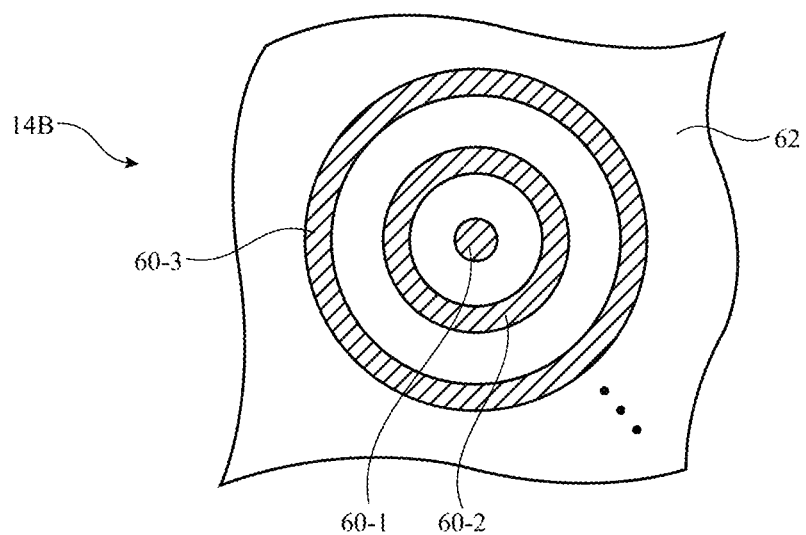
FIG. 7 is a top view of an illustrative liquid crystal lens in accordance with an embodiment.

FIG. 6 shows how lens 14B may be formed by using patterned electrodes to rotate the liquid crystals of layer 50 during polymer curing. As shown in FIG. 6, lens 14B may have a curable birefringent layer such as layer 50 that is formed between transparent substrates 62 and 66 (e.g., glass or plastic layers). Transparent electrode 64 (e.g., an indium tin oxide layer) may be formed on the surface of substrate 66 that faces layer 50. A set of patterned electrodes 60 may be formed on the surface of substrate 62 that faces layer 50. Layer 64 may be a blanket film that covers the surface of substrate 66. Electrodes 60 may form a series of concentric rings such as illustrative rings 60-1, 60-2, and 60-3. There may be any suitable number of rings in electrodes 60 (e.g., five or more, ten or more, twenty or more, etc.). Each ring-shaped electrode may receive a different respective voltage (see, e.g., voltages V0, V1, and V2 in the example of FIG. 6) and may therefore rotate the liquid crystals in a respective underlying portion of layer 50 by a correspondingly different amount. By appropriate selection of the voltages of the ring-shape electrodes, the index of refraction of layer 50 may be progressively varied as a function of radial distance R from center CNT of lens 14B, thereby providing lens 14B with a desired index of refraction profile and focal length. Birefringence may be imparted to lens 14B using an asymmetric configuration for electrodes 60, using alignment layers, etc. The polymer material of layer 50 may be cured by application of ultraviolet light to layer 50 while the voltages are applied to electrodes 60. After layer 50 has been cured in this way, the voltages on electrodes 60 may be removed. A top view of illustrative electrodes 60-1, 60-2, and 60-3 of FIG. 6 is shown in FIG. 7.

Figure 8:
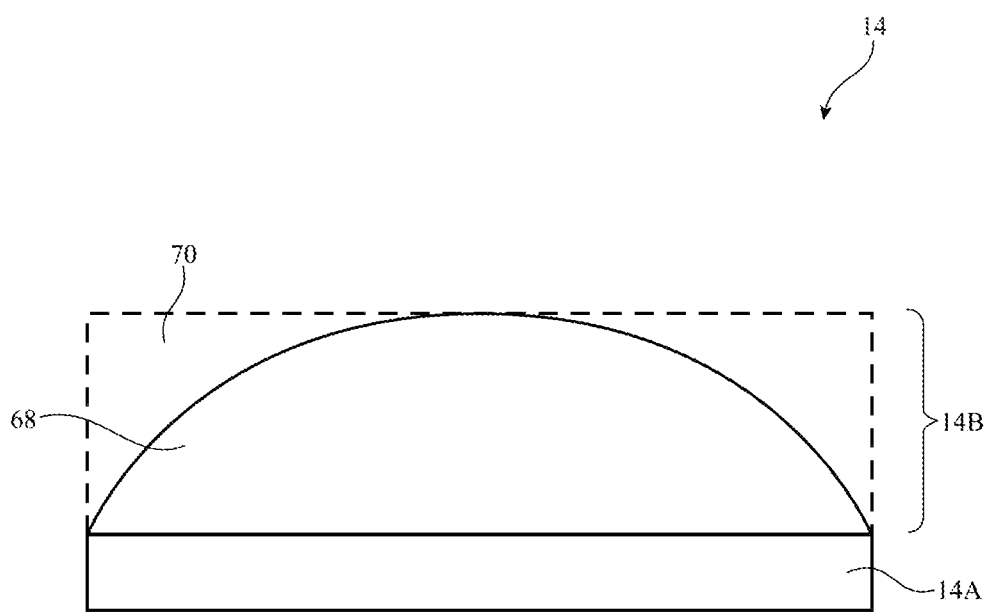
FIG. 8 is a cross-sectional side view of an illustrative tunable birefringent lens formed from a polished birefringent material in accordance with an embodiment.

If desired, lens 14B may be formed from a polished solid birefringent material such as calcite or other birefringent crystal. This type of arrangement is shown in FIG. 8. As shown in FIG. 8, lens 14 may include polished birefringent crystal 68 having a desired shape for forming lens 14B and may include polarization rotator 14A. Polarization rotator 14A may be, for example, a twisted nematic liquid crystal polarization rotator of the type described in connection with FIG. 3 or may be any other type of polarization rotator. If desired, an optional layer of material such as layer 70 may be applied to the upper surface of lens element 68. As described in connection with layer 54 of FIG. 3, the index of refraction of layer 70 may be the same as the ordinary index of refraction no of lens element 68 or may be greater or less than index no. Lenses of the type shown in FIG. 8 may be stacked with other adjustable lenses and may be incorporated into an optical system such as optical system 10 of FIG. 1 or other suitable optical system, as described in connection with FIG. 4.

The foregoing is merely illustrative and various modifications can be made by those skilled in the art without departing from the scope and spirit of the described embodiments. The foregoing embodiments may be implemented individually or in any combination.

What is claimed is:

1. A system, comprising:
a display having an array of pixels that creates images;
a birefringent polymer lens;
a polarization rotator, wherein light from the images passes through the polarization rotator and the birefringent polymer lens in that order; and
control circuitry that places the polarization rotator alternately in first and second states, wherein the light passes through the polarization rotator without rotation when the polarization rotator is in the first state and wherein the light passes through the polarization rotator with a 90° polarization rotation when the polarization rotator is in the second state, wherein the polarization rotator comprises a liquid crystal polarization rotator, wherein the birefringent polymer lens comprises liquid crystal material in a cured polymer, wherein the birefringent polymer lens comprises one of a plurality of birefringent polymer lenses, wherein the polarization rotator comprises one of a plurality of polarization rotators, and wherein the system includes a plurality of stacked tunable lenses each of which includes a respective one of the plurality of birefringent polymer lenses and each of which includes a respective one of the plurality of polarization rotators.

2. The system defined in claim 1 wherein the polarization rotator comprises a twisted nematic liquid crystal polarization rotator.

3. The system defined in claim 1 wherein the display comprises a transparent display and wherein light from an external object passes through the display and through the polarization rotator.

4. The system defined in claim 1 further comprising a linear polarizer that linearly polarizes light entering the polarization rotator.

5. The system defined in claim 1 wherein the birefringent polymer lens comprises first and second liquid crystal alignment layers.

6. The system defined in claim 5 wherein the liquid crystal material in the cured polymer is interposed between the first and second liquid crystal alignment layers.

7. The system defined in claim 1, wherein the polarization rotator is interposed between the display and the birefringent polymer lens.

8. A tunable lens, comprising:
a birefringent lens element;
a liquid crystal polarization rotator;
a linear polarizer that polarizes light entering the liquid crystal polarization rotator to produce light with a linear polarization, wherein the liquid crystal polarization rotator is operable in a first state in which the linear polarization of the light is not rotated by the liquid crystal polarization rotator and the birefringent lens element has a first focal length and a second state in which the linear polarization of the light is rotated by the liquid crystal polarization rotator and the birefringent lens element has a second focal length that is different than the first focal length; and
a polymer layer on the birefringent lens element, wherein the birefringent lens element is characterized by an ordinary index of refraction and an extraordinary index of refraction, and wherein the polymer layer has an index of refraction equal to the ordinary index of refraction.

9. The tunable lens defined in claim 8 wherein the liquid crystal polarization rotator comprises a twisted nematic polarization rotator.

10. The tunable lens defined in claim 8 wherein the birefringent lens element comprises a polished birefringent crystal.

11. A system, comprising:
control circuitry;
a display coupled to the control circuitry that produces image light; and
a plurality of stacked tunable lenses that receive the image light, wherein each of the tunable lenses has a respective tunable focal length, wherein each of the stacked tunable lenses comprises a birefringent polymer lens element and a polarization rotator, wherein the control circuitry is configured to control the polarization rotator of each tunable lens to select an overall focal length for the plurality of stacked tunable lenses, and wherein the control circuitry is configured to repeatedly switch the overall focal length in synchronization with images being displayed on the display.

12. The system defined in claim 11 wherein the polarization rotator comprises first and second transparent electrodes and a layer of liquid crystal material interposed between the first and second transparent electrodes and wherein the birefringent polymer lens elements each include a pair of liquid crystal alignment layers.

13. The system defined in claim 11 wherein the birefringent polymer lens elements each include a plurality of ring-shaped electrodes.

* * * * *